(12) United States Patent
Gupta (10) Patent No.: US 7,778,998 B2
(45) Date of Patent: *Aug. 17, 2010

(54) LIQUID DATA SERVICES

(75) Inventor: Naveen Gupta, Sunnyvale, CA (US)

(73) Assignee: BEA Systems, Inc., Redwood Shores, CA (US)

( * ) Notice: Subject to any disclaimer, the term of this patent is extended or adjusted under 35 U.S.C. 154(b) by 277 days.

This patent is subject to a terminal disclaimer.

(21) Appl. No.: 11/342,111

(22) Filed: Jan. 27, 2006

(65) Prior Publication Data

US 2006/0218117 A1 Sep. 28, 2006

Related U.S. Application Data

(60) Provisional application No. 60/665,908, filed on Mar. 28, 2005.

(51) Int. Cl.
*G06F 7/00* (2006.01)
(52) U.S. Cl. ..................................... 707/714
(58) Field of Classification Search ............... 707/104, 707/3–5
See application file for complete search history.

(56) References Cited

U.S. PATENT DOCUMENTS

| 5,544,355 | A | * | 8/1996 | Chaudhuri et al. ............. 707/2 |
| 5,701,453 | A | | 12/1997 | Maloney et al. |
| 5,764,973 | A | | 6/1998 | Lunceford |
| 5,802,518 | A | | 9/1998 | Karaev et al. |
| 5,940,289 | A | | 8/1999 | Iwata |
| 6,023,510 | A | | 2/2000 | Epstein |
| 6,175,837 | B1 | | 1/2001 | Sharma et al. ........... 707/103 Y |
| 6,226,635 | B1 | | 5/2001 | Katariya |
| 6,336,114 | B1 | | 1/2002 | Garrison |
| 6,374,256 | B1 | | 4/2002 | Ng et al. |
| 6,505,188 | B1 | * | 1/2003 | Ghazal et al. ................. 707/2 |
| 6,539,380 | B1 | | 3/2003 | Moran |
| 6,658,432 | B1 | | 12/2003 | Alavi |
| 6,801,229 | B1 | | 10/2004 | Tinkler |
| 6,823,362 | B2 | | 11/2004 | Eshghi |
| 6,862,594 | B1 | | 3/2005 | Saulpaugh et al. ............ 707/10 |
| 7,080,224 | B2 | | 7/2006 | Soejima |
| 7,181,513 | B1 | | 2/2007 | Harada |
| 7,216,125 | B2 | | 5/2007 | Goodwin |

(Continued)

FOREIGN PATENT DOCUMENTS

WO    WO 03098460    11/2003

OTHER PUBLICATIONS

Hasan et al., Open Issues in Parallel Query Optimization, SIGMOD Record, vol. 25, No. 3, Sep. 1996.*

(Continued)

*Primary Examiner*—Tim T. Vo
*Assistant Examiner*—Gary Koo
(74) *Attorney, Agent, or Firm*—Fliesler Meyer LLP (57) ABSTRACT

In accordance with embodiments of the present invention, there are provided mechanisms and methods for using query plans for building and performance tuning services accessed on behalf of a requestor. These mechanisms and methods for using query plans for building and performance tuning services makes it possible to examine the query plan and response times for query execution. The ability to examine the query plans and response times for query execution makes it possible to improve query efficiency and apply caching more effectively.

14 Claims, 7 Drawing Sheets

U.S. PATENT DOCUMENTS

| | | | |
|---|---|---|---|
| 7,257,597 B1* | 8/2007 | Pryce et al. | 707/102 |
| 7,337,170 B2* | 2/2008 | Lee et al. | 707/6 |
| 2001/0023421 A1 | 9/2001 | Numao | |
| 2002/0016777 A1 | 2/2002 | Seamons | |
| 2002/0091975 A1 | 7/2002 | Redlich | |
| 2002/0099699 A1 | 7/2002 | Kindo | |
| 2002/0166052 A1 | 11/2002 | Garg | |
| 2003/0014394 A1 | 1/2003 | Fujiwara | |
| 2003/0084030 A1* | 5/2003 | Day et al. | 707/3 |
| 2003/0097443 A1 | 5/2003 | Gillett | |
| 2003/0110073 A1 | 6/2003 | Briel | |
| 2003/0217033 A1 | 11/2003 | Sandler et al. | |
| 2003/0236782 A1* | 12/2003 | Wong et al. | 707/5 |
| 2004/0044651 A1* | 3/2004 | Abdo | 707/2 |
| 2004/0088313 A1 | 5/2004 | Torres | |
| 2004/0139043 A1 | 7/2004 | Lei | |
| 2004/0153451 A1 | 8/2004 | Phillips et al. | |
| 2004/0181537 A1 | 9/2004 | Chawla | |
| 2004/0267876 A1 | 12/2004 | Kakivaya et al. | |
| 2005/0246338 A1 | 11/2005 | Bird | |
| 2006/0106777 A1* | 5/2006 | Faunce et al. | 707/3 |
| 2006/0155863 A1 | 7/2006 | Schmidt | |
| 2006/0200463 A1 | 9/2006 | Dettinger | |
| 2006/0224563 A1* | 10/2006 | Hanson et al. | 707/2 |
| 2007/0038610 A1 | 2/2007 | Omoigui | |

OTHER PUBLICATIONS

Oracle, Oracle8i Concepts, Sep. 14, 2004.*

Ryutov, T., Neuman, C., Kim, D., "Dynamic Authorization and Intrusion Response in Distributed Systems," DARPA, Apr. 2003, vol. 1, pp. 50-61.

Gennick, J., "SQL in, XML out," Oracle Magazine, May/Jun. 2003, pp. 1-5, http://www.oracle.com/technology/oramag/oracle/03-may/o33xml.html.

Beatty, John et al., "Service Data Objects", IBM Corp and BEA Systems, Inc., version 1.0 Nov. 2003, retrieved from http://ftpna2.bea.com/pub/downloads/commonj/Commonj-SDO-Specification-v1.0.pdf on Sep. 4, 2008, 40 pages.

PCT International Search Report in re PCT/US06/11020 dated Jul. 14, 2008, 12 pages.

* cited by examiner

LIQUID DATA SERVICES

CLAIM TO PRIORITY

The present application claims the benefit of:
U.S. patent application No. 60/665,908, entitled; LIQUID DATA SERVICES, by Naveen Gupta, filed Mar. 28, 2005.

CROSS REFERENCE TO RELATED APPLICATIONS

The following commonly owned, co-pending U.S. patents and patent applications, including the present application, are related to each other. Each of the other patents/applications are incorporated by reference herein in its entirety:

U.S. patent application No. 60/665,908 entitled "LIQUID DATA SERVICES", filed on Mar. 28, 2005;

U.S. patent application No. 60/666,079 entitled "MODELING FOR DATA SERVICES", filed on Mar. 29, 2005;

U.S. patent application No. 60/665,768 entitled "USING QUERY PLANS FOR BUILDING AND PERFORMANCE TUNING SERVICES", filed on Mar. 28, 2005;

U.S. patent application No. 60/665,696 entitled "SECURITY DATA REDACTION", filed on Mar. 28, 2005;

U.S. patent application No. 60/665,667 entitled "DATA REDACTION POLICIES", filed on Mar. 28, 2005;

U.S. patent application No. 60/665,944 entitled "SMART SERVICES", filed on Mar. 29, 2005;

U.S. patent application No. 60/665,943 entitled "AD HOC QUERIES FOR SERVICES", filed on Mar. 29, 2005; and U.S. patent application No. 60/665,964 entitled "SQL INTERFACE FOR SERVICES", filed on Mar. 29, 2005.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to accessing services on behalf of applications, and more particularly to a mechanism for using query plans for building and performance tuning services.

BACKGROUND

Increasingly, enterprises are looking for ways to simplify access and organization of Information Technology (IT) services. One mechanism for providing such IT simplification is Service Oriented Architecture (SOA). Application of SOA principles promises faster development cycles, increased reusability and better change tolerance for software components.

Unfortunately, enterprises that implement SOA often find that the start-up complexities of SOA delays, if not derails, the expected return on investment. While SOA simplifies the complexity of an IT environment, organizations lack sufficient experience with SOA technology required for a quick, trouble-free implementation. Compounding this experience gap, graphical tools for implementing SOA are not readily available, so that data services for use in SOA environments often must be hand-coded.

One area in the enterprise-class portal and Web applications areas that receives significant developer time and attention, for example, is the perceived need to keep response times for user applications to a minimum. From the point-of-view of a user, the service must perform at or near the level of native access mechanisms. Accordingly, there is an ongoing need for improved techniques for reducing lag time between when a request is issued and when information is returned.

DETAILED DESCRIPTION

In accordance with embodiments of the present invention, there are provided mechanisms and methods for using query plans for building and performance tuning services accessed on behalf of a requester. A query plan comprises steps to take to get data to satisfy a query. These mechanisms and methods for using query plans for building and performance tuning services makes it possible to examine the query plan and response times for query execution. The ability to examine the query plans and response times for query execution makes it possible to improve query efficiency and apply caching more effectively.

In one embodiment, the invention provides a method for accessing a service. One embodiment of the method includes receiving a query. A preferred way for satisfying the query is determined from one or more possible ways for satisfying the query. The preferred way is provided as at least a portion of the query plan. Determining a preferred way for satisfying the query includes, in one embodiment, determining one or more ways for satisfying the query. Then, a preferred way for satisfying the query that meets a performance criteria is select and provided in a query plan. The query plan may be used to access one or more services to obtain a result set. The result set from accessing the service according to the query plan may be provided to a requester, along with information about time or resources usage to perform the query. Input that specifies a change to the query plan for improving query efficiency may be received from the requestor responsive to this information.

In an example embodiment in which a join operation is to be conducted on information stored in multiple databases, selecting a preferred way for satisfying the query and meeting a performance criteria can include selecting a technique such as reading each of the database tables into memory and then performing a join operation, if speed performance is preferred over memory usage performance. Alternatively, a technique such as reading a smaller one of the tables into memory and then requesting values from remaining tables as needed to complete a join operation could be selected if memory capacity would be constrained by at least one table. Another alternative technique such as requesting values from each of the tables as needed to complete a join operation could be selected if both tables are too large to be brought into memory.

Potential preferred ways may be selected from a variety of techniques for reducing overhead through distributed query techniques, such as: SQL pushdown techniques, batched join processing techniques, index join techniques and parallel data source requests. SQL pushdown techniques include deferring processing to the underlying SQL sources for operations such as string searches, comparison operations, local joins, sorting, aggregate functions, and grouping. Batched join processing techniques include passing join values from one data source to another data source in batches, which can reduce the number of SQL calls that would otherwise be needed for the join. Index join techniques include fetching join targets in their entirety into memory in one call if one of the join tables is small (e.g. code table). Parallel data source requests employ parallelism to reduce latency for queries involving multiple data sources.

In one embodiment, a streaming API passes data as a continuous stream from the underlying data source to the consuming application. In one embodiment, time-out instructions are wrapped around a portion of a query that depends upon unreliable data. These time-out instructions specify how long to wait for a response from the data source and what the alternative content to be returned to the caller if the time out expires. In one embodiment, a query plan viewer is provided to assist with creating efficient queries. The query plan viewer shows a compiled view of the query to enable users to improve queries. In one embodiment, optimization techniques may be used for speeding data access and transformations as well.

As used herein, the term performance criteria is intended to be broadly construed to include any condition placed upon a time or resources usage. Some examples of performance criteria include without limitation a maximum query response time, an average response time for data queries, a peak usage or a maximum degradation of performance. For example, in a business environment, an application may use query response times to provide a measurement for ensuring and documenting compliance with performance-based service level agreements (SLA). A business partner that has such a SLA can see the average response time of data queries, when peak usage occurs, what sources are degrading performance, and so on.

As used herein, the term service is intended to be broadly construed to include any computer resident application capable of providing services to a requestor or other recipient, including without limitation network based applications, web based server resident applications, web portals, search engines, photographic, audio or video information storage applications, e-Commerce applications, backup or other storage applications, sales/revenue planning, marketing, forecasting, accounting, inventory management applications and other business applications and other contemplated computer implemented services. The term result set is intended to be broadly construed to include any result provided by one or more services. Result sets may include multiple entries into a single document, file, communication or other data construct.

As used herein, the term view is intended to be broadly construed to include any mechanism that provides a presentation of data and/or services in a format suited for a particular application, service, client or process. The presentation may be virtualized, filtered, molded, or shaped. For example, data returned by services to a particular application (or other service acting as a requestor or client) can be mapped to a view associated with that application (or service). Embodiments can provide multiple views of available services to enable organizations to compartmentalize or streamline access to services, increasing the security of the organization's IT infrastructure.

Figure 1A:
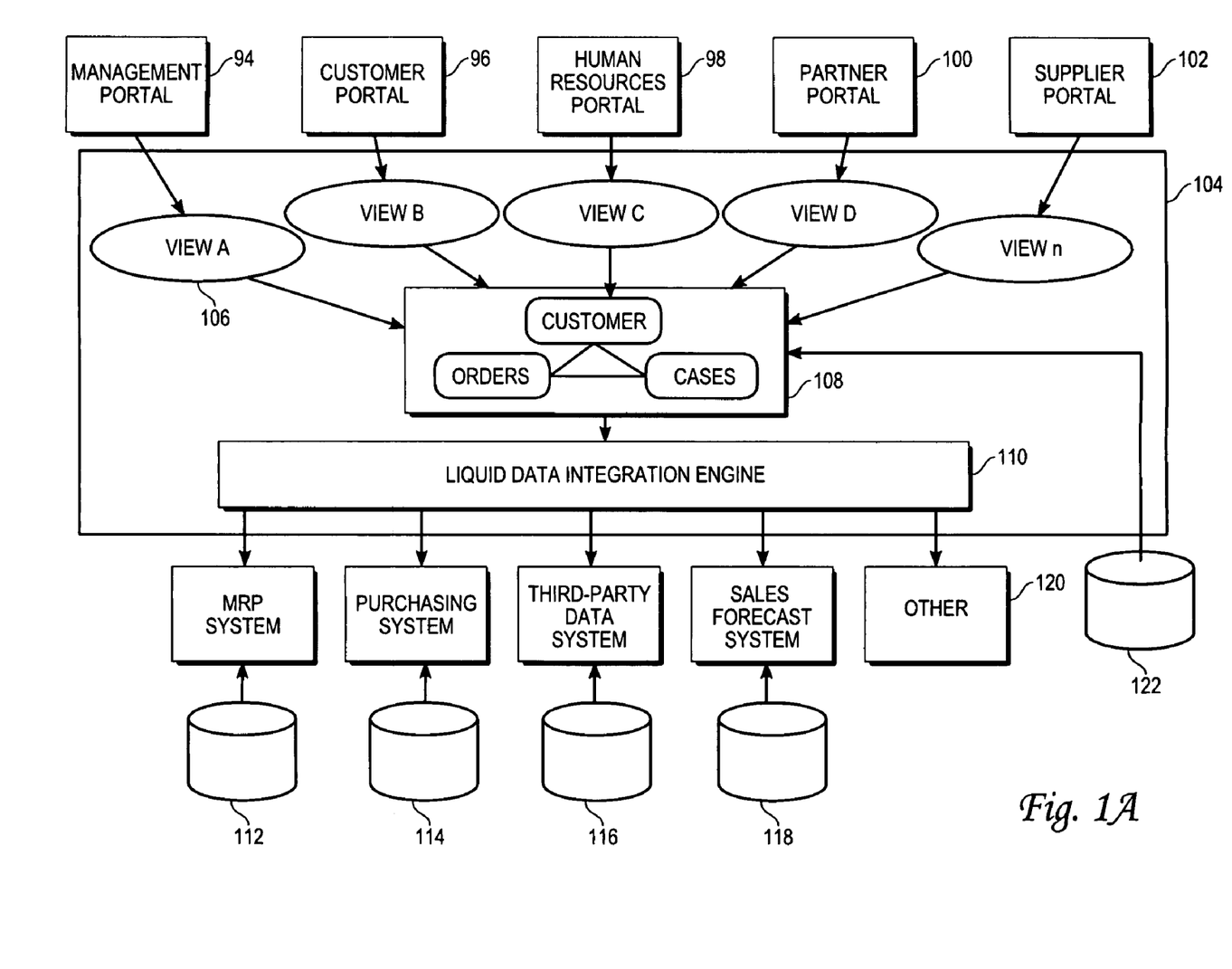
FIGS. 1A-1B are functional block diagrams illustrating an example computing environment in which techniques for accessing services may be implemented in one embodiment.
Figure 1B:
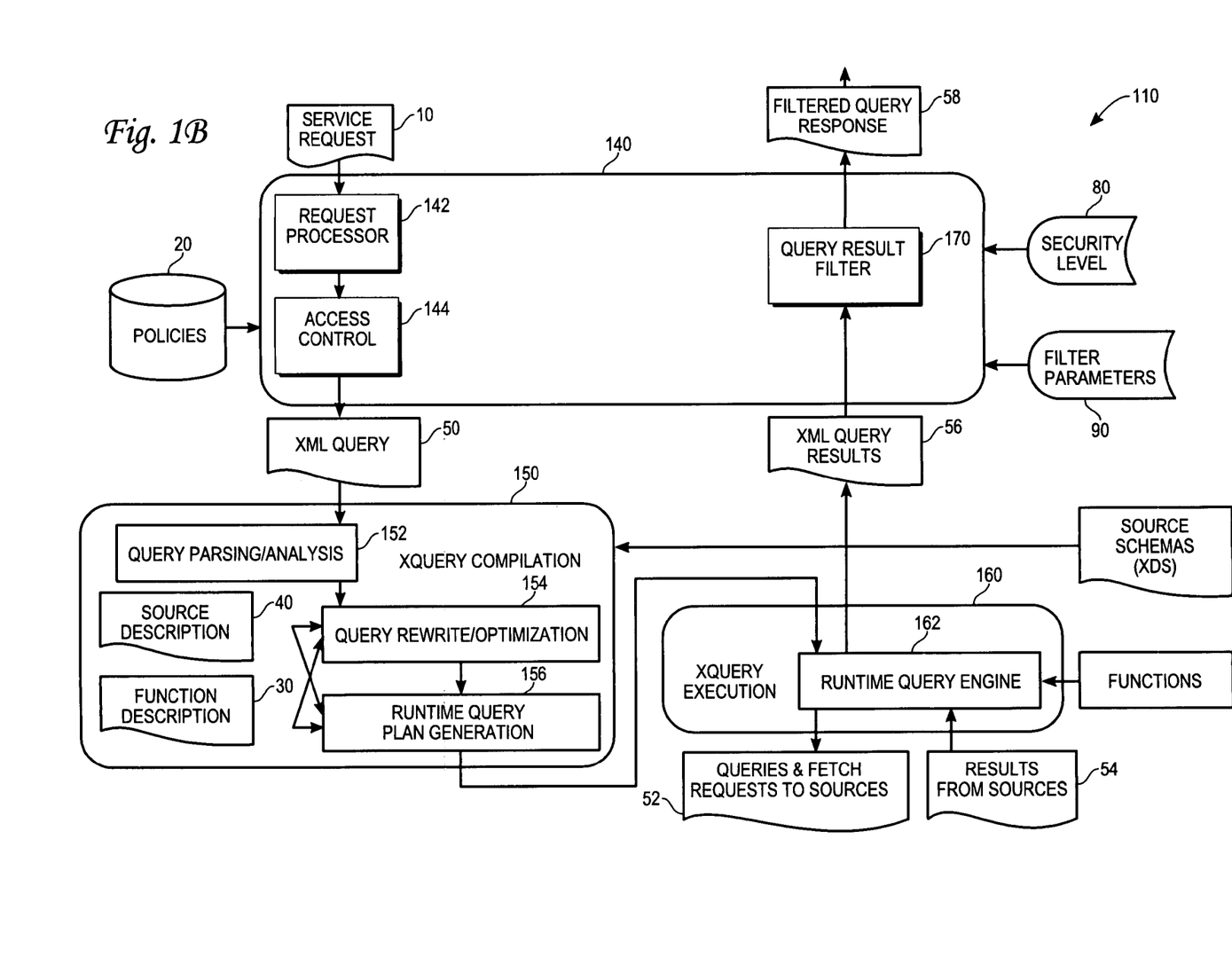

As used herein, the term query plan is intended to be broadly construed to include steps to take to get data to satisfy a query. For example:
Go to source 1, get customer data
Go to source 2, get order data
Join Customer data with Order data
Sort customer data by Name
return the data to calling application FIGS. 1A-1B are functional block diagrams illustrating an example computing environment in which techniques for data redaction may be implemented in one embodiment. As shown in FIG. 1A, a liquid data framework 104 is used to provide a mechanism by which a set of applications, or application portals 94, 96, 98, 100 and 102, can integrate with, or otherwise access in a tightly couple manner, a plurality of services. Such services may include a Materials Requirements and Planning (MRP) system 112, a purchasing system 114, a third-party relational database system 116, a sales forecast system 118 and a variety of other data-related services 120. Although not shown in FIG. 1A for clarity, in one embodiment, one or more of the services may interact with one or more other services through the liquid data framework 104 as well.

Internally, the liquid data framework 104 employs a liquid data integration engine 110 to process requests from the set of portals to the services. The liquid data integration engine 110 allows access to a wide variety of services, including data storage services, server-based or peer-based applications, Web services and other services capable of being delivered by one or more computational devices are contemplated in various embodiments. A services model 108 provides a structured view of the available services to the application portals 94, 96, 98, 100 and 102. In one embodiment, the services model 108 provides a plurality of views 106 that may be filtered, molded, or shaped views of data and/or services into a format specifically suited for each portal application 94, 96, 98, 100 and 102. In one embodiment, data returned by services to a particular application (or other service acting as a requester or client) is mapped to the view 106 associated with that application (or service) by liquid data framework 104. Embodiments providing multiple views of available services can enable organizations to compartmentalize or streamline access to services, thereby increasing the security of the organization's IT infrastructure. In one embodiment, services model 108 may be stored in a repository 122 of service models. Embodiments providing multiple services models can enable organizations to increase the flexibility in changing or adapting the organization's IT infrastructure by lessening dependence on service implementations.

FIG. 1B is a high level schematic of a liquid data integration engine 110 illustrated in FIG. 1A with reference to one example embodiment. As shown in FIG. 1B, the liquid data integration engine 110 includes an interface processing layer 140, a query compilation layer 150 and a query execution layer 160. The interface layer 140 includes a request processor 142, which takes the request 10 and processes this request into an XML query 50. Interface layer 140 also includes access control mechanism 144, which determines based upon a plurality of policies 20 whether the client, portal application, service or other process making the request 10 is authorized to access the resources and services required to satisfy the request. Provided that the client, application, service or other process is authorized to make the request 10, the interface layer sends the XML query 50 to the query compilation layer 150.

Within the query compilation layer 150, a query parsing and analysis mechanism 152 receives the query 50 from the client applications, parses the query and sends the results of the parsing to a query rewrite optimizer 154. The query rewrite optimizer 154 determines whether the query can be rewritten in order to improve performance of servicing the query based upon one or more of execution time, resource use, efficiency or other performance criteria. The query rewrite optimizer 154 may rewrite or reformat the query based upon input from one or more of a source description 40 and a function description 30 if it is determined that performance may be enhanced by doing so. A runtime query plan generator 156 generates a query plan for the query provided by the query rewrite optimizer 154 based upon input from one or more of the source description 40 and the function description 30. Techniques for accessing services on behalf of a requestor implemented by runtime query plan generator 156 will be described below in greater detail with reference to FIGS. 2A-2C.

The query compilation layer 150 passes the query plan output from the runtime query plan generator 156 to a runtime query engine 162 in the query execution layer 160. The runtime query engine 162 is coupled with one or more functions 70 that may be used in conjunction with formulating queries and fetch requests to sources 52, which are passed on to the appropriate service(s). The service responds to the queries and fetch requests 52 with results from sources 54. The runtime query engine 162 of the query execution layer 160 translates the results into a format usable by the client or portal application, such as without limitation XML, in order to form the XML query results 56.

Before responses or results 56 are passed back to the client or portal application making the request, a query result filter 146 in the interface layer 140 determines based upon filter parameters 90 what portion of the results will be passed back to the client or portal application, forming a filtered query response 58. Although not shown in FIG. 1B for clarity, filter parameters 90 may accompany service request 10 in one embodiment. Further, query result filter 146 also determines based upon access policies implementing security levels 80 what portions of the filtered query response 58 a requestor is permitted to access and may redact the filtered query response accordingly. Although not shown in FIG. 1B for clarity, access policies implementing security levels 80 may be stored with policies 20 in one embodiment. When properly formed, the response is returned to the calling client or portal application.

Figure 2A:
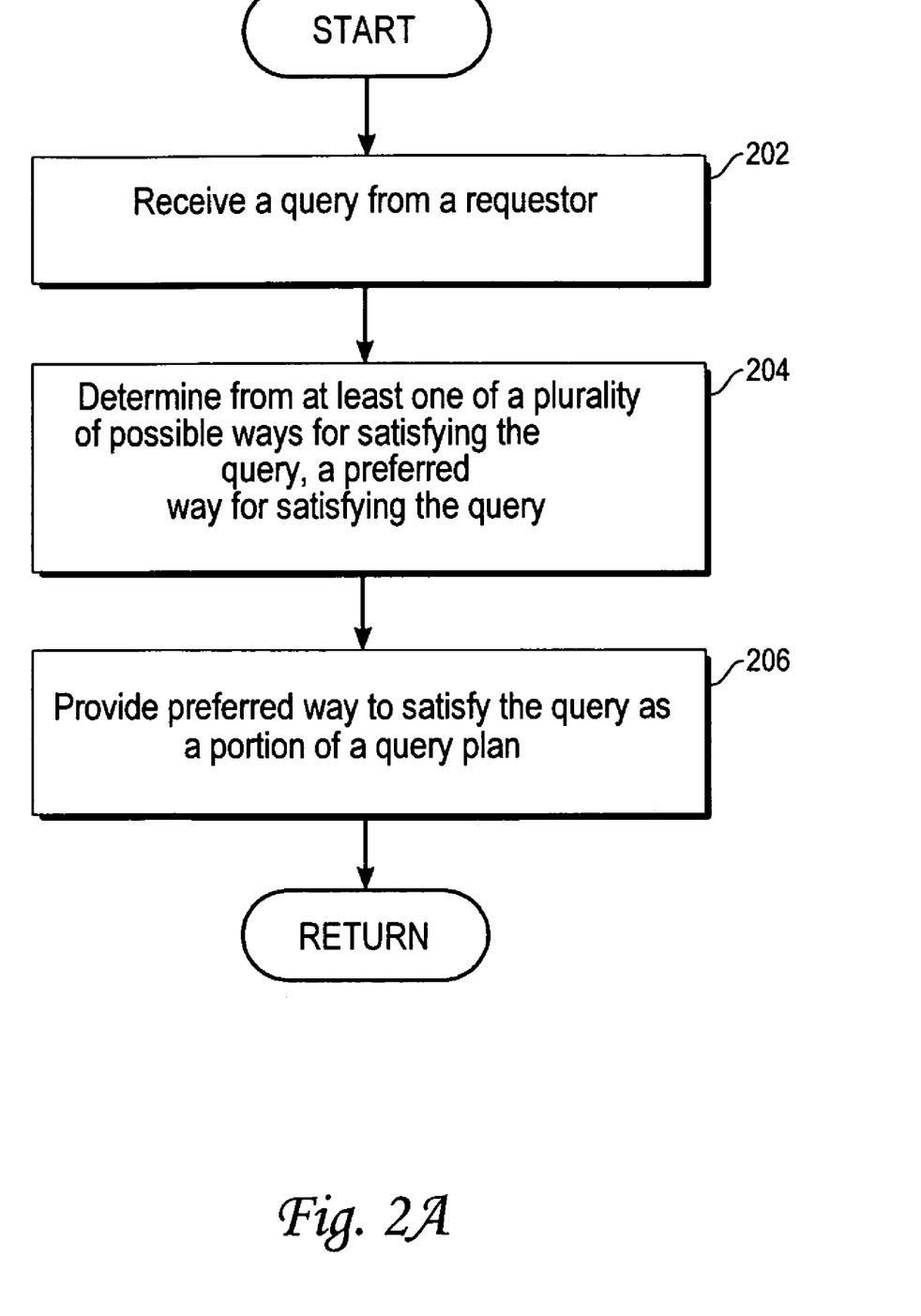
FIG. 2A is an operational flow diagram illustrating a high level overview of a technique for preparing a query plan for tuning a service in one embodiment of the present invention.

FIG. 2A is an operational flow diagram illustrating a high level overview of a technique for preparing a query plan for tuning a service of one embodiment of the present invention. The technique for accessing a service shown in FIG. 2A is operable with an application sending data, such as Materials Requirements and Planning (MRP) system 112, an purchasing system 114, a third-party relational database system 116, sales forecast system 118, or a variety of other data-related services 120 of FIG. 1A, for example. As shown in FIG. 2A, a query is received from a requestor (block 202). A preferred way for satisfying the query is determined from one or more possible ways for satisfying the query (block 204). The preferred way is provided as at least a portion of the query plan (block 206). In one embodiment, the method illustrated by blocks 202-206 may be advantageously disposed in the interface processing layer 140, query compilation layer 150 and query execution layer 160 of FIG. 1B.

Figure 2B:
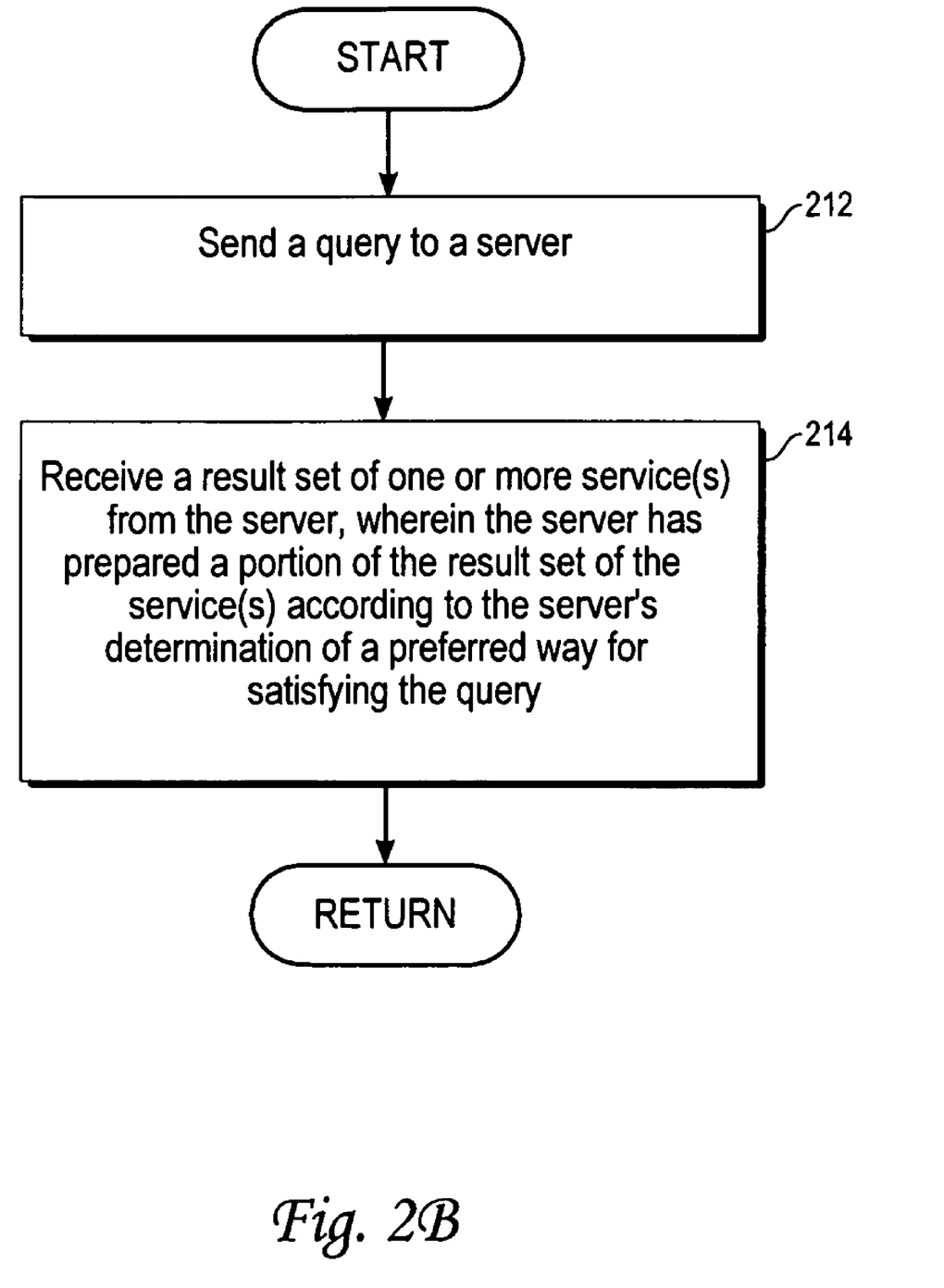
FIG. 2B is an operational flow diagram illustrating a high level overview of a client process operable with the technique for preparing a query plan for tuning a service illustrated in FIG. 2A.

FIG. 2B is an operational flow diagram illustrating a high level overview of a client process operable with the technique for preparing a query plan for tuning a service illustrated in FIG. 2A. The technique for receiving data shown in FIG. 2B is operable with an application sending data, such as applications application 94, 96, 98, 100 and 102 of FIG. 1A, for example or a service, such as Materials Requirements and Planning (MRP) system 112, an purchasing system 114, a third-party relational database system 116, sales forecast system 118, or a variety of other data-related services 120 of FIG. 1A. As shown in FIG. 2B, a query is sent to a server (block 212). A result set of one or more services is received (block 214) from the server. The result set includes a portion that has been prepared by the server according to the server's determination of a preferred way for satisfying the query. Optionally, an input specifying a change to the way the query was implemented for improving query efficiency is sent to the server (not shown in FIG. 2B for clarity).

Figure 2C:
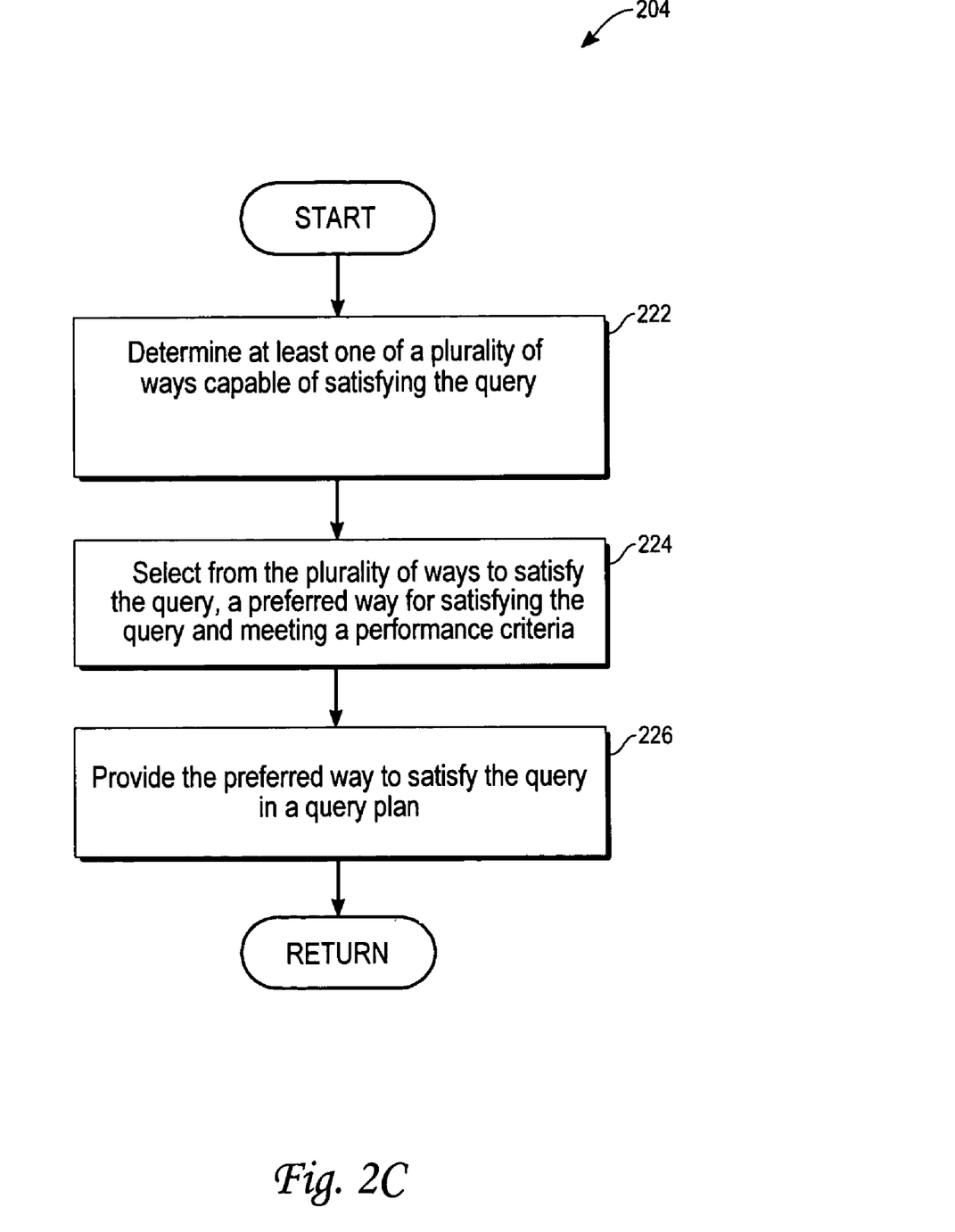
FIG. 2C is an operational flow diagram of an example a technique for determining a preferred way for satisfying a query, which may be used in conjunction with the technique illustrated in FIG. 2A.

FIG. 2C is an operational flow diagram of an example a technique for determining a preferred way for satisfying a query, which may be used in conjunction with the technique illustrated in FIG. 2A. As shown in FIG. 2C at least one of a plurality of ways for satisfying the query are determined (block 222). A preferred way for satisfying the query and meeting performance criteria is selected from the plurality of ways (block 224). The selected way is provided in a query plan (block 226).

Figure 3:
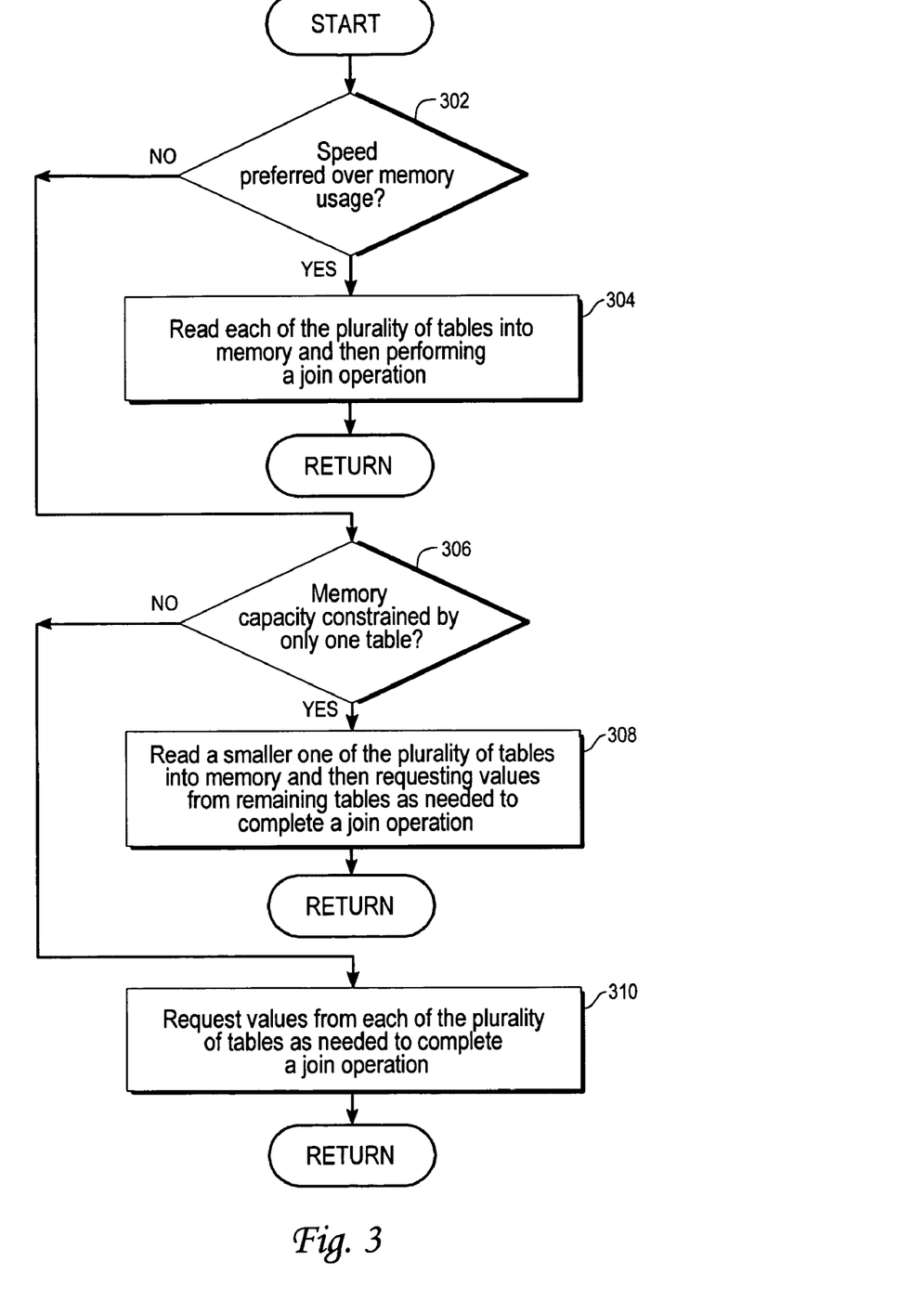
FIG. 3 is an operational flow diagram illustrating a high level overview of an example embodiment implementing a query processing selection technique.

Some of the features and benefits of the present invention will be illustrated with reference to FIG. 3, which is an operational flow diagram illustrating a high level overview of an example embodiment implementing a query processing selection technique. As shown in FIG. 3, a determination whether speed is more important than memory usage is made (block 302). In various embodiments, this determination can be made in a variety of ways. For example, in some embodiments, information about speed, memory and other resource requirements may be solicited from an IT administrator or other such person. In other embodiments, parameters correlating the relative importance of speed, memory and other resource usage may be encoded in a configuration file or other data structure. In still other embodiments, the determination of parameters correlating the relative importance of speed, memory and other resource usage may be automated by processing designed to run test cases of the system in order to determine physical limitations, i.e., installed memory, processor clock speed, I/O devices and configurations or the like, of the underlying system. If speed performance is preferred over memory usage performance, then each of the plurality of tables is read into memory and then a join operation is performed (block 304). Otherwise, a determination whether memory capacity would be constrained by including only one table is made (block 306). If memory capacity would be constrained by including at least one table, then a smaller one of the plurality of tables is read into memory and values are requested from remaining tables as needed to complete a join operation (block 308). Otherwise, values are requested from each of the plurality of tables as needed to complete a join operation (block 310). The foregoing example is intended to be illustrative of on example selection of a preferred way to satisfy a query from potential ways to satisfy a query, and is not intended to limit the many types of potential queries, selection mechanisms and performance criteria useful in various embodiments of the present invention.

In other aspects, the invention encompasses in some embodiments, computer apparatus, computing systems and machine-readable media configured to carry out the foregoing methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of rotating media including floppy disks, optical discs, DVD, CD-ROMs, microdrive, and magneto-optical disks, and magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to providing mechanisms and methods for using query plans for building and performance tuning services as discussed herein.

Figure 4:
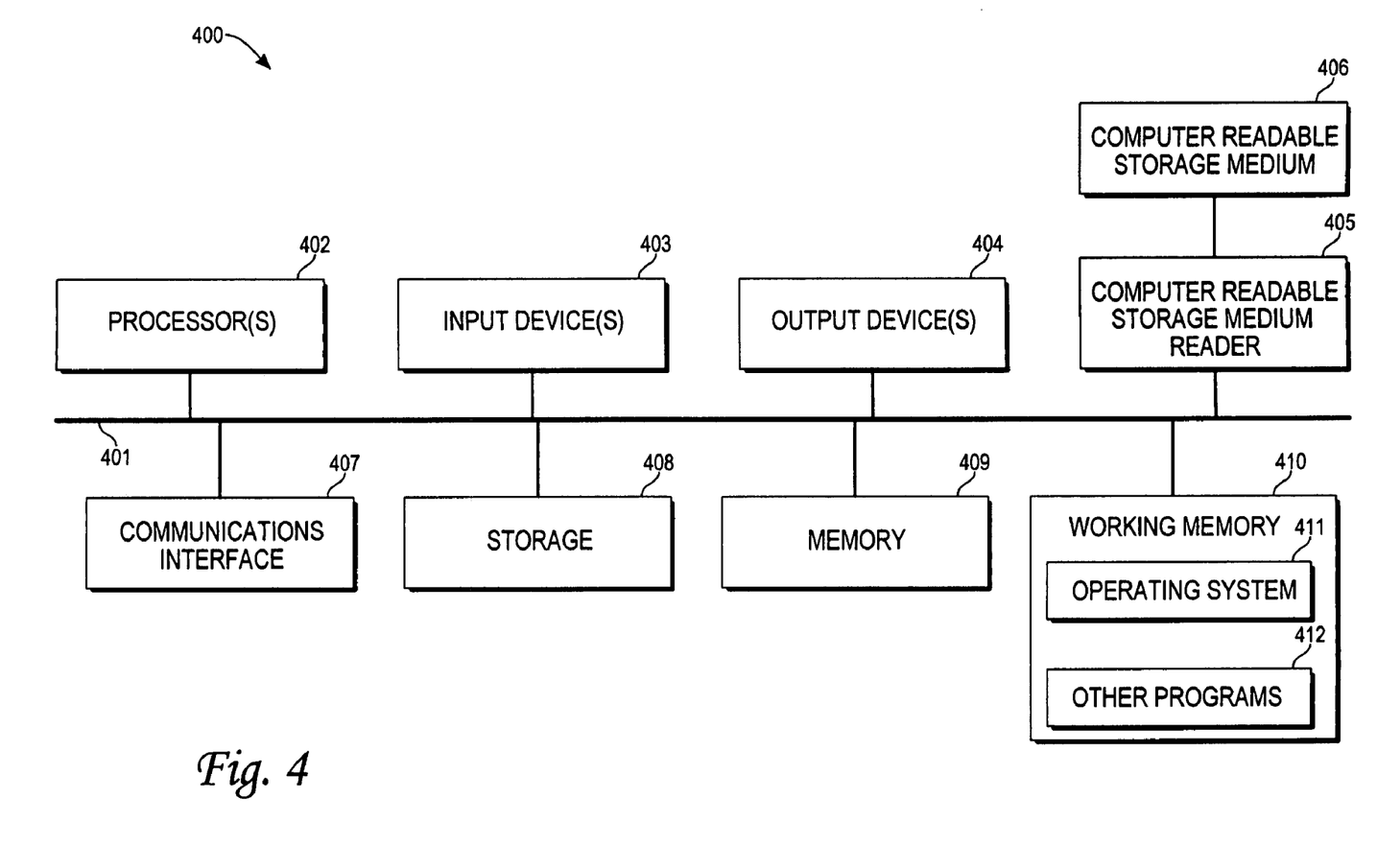
FIG. 4 is a hardware block diagram of an example computer system, which may be used to embody one or more components of an embodiment of the present invention.

FIG. 4 illustrates an exemplary processing system 400, which can comprise one or more of the elements of FIGS. 1A and 1B. Turning now to FIG. 4, an exemplary computing system is illustrated that may comprise one or more of the components of FIGS. 1A and 1B. While other alternatives might be utilized, it will be presumed for clarity sake that components of the systems of FIGS. 1A and 1B are implemented in hardware, software or some combination by one or more computing systems consistent therewith, unless otherwise indicated.

Computing system 400 comprises components coupled via one or more communication channels (e.g., bus 401) including one or more general or special purpose processors 402, such as a Pentium®, Centrino®, Power PC®, digital signal processor ("DSP"), and so on. System 400 components also include one or more input devices 403 (such as a mouse, keyboard, microphone, pen, and so on), and one or more output devices 404, such as a suitable display, speakers, actuators, and so on, in accordance with a particular application. (It will be appreciated that input or output devices can also similarly include more specialized devices or hardware/software device enhancements suitable for use by the mentally or physically challenged.)

System 400 also includes a computer readable storage media reader 405 coupled to a computer readable storage medium 406, such as a storage/memory device or hard or removable storage/memory media; such devices or media are further indicated separately as storage 408 and memory 409, which may include hard disk variants, floppy/compact disk variants, digital versatile disk ("DVD") variants, smart cards, read only memory, random access memory, cache memory, and so on, in accordance with the requirements of a particular application. One or more suitable communication interfaces 407 may also be included, such as a modem, DSL, infrared, RF or other suitable transceiver, and so on for providing inter-device communication directly or via one or more suitable private or public networks or other components that may include but are not limited to those already discussed.

Working memory 410 further includes operating system ("OS") 411 elements and other programs 412, such as one or more of application programs, mobile code, data, and so on for implementing system 400 components that might be stored or loaded therein during use. The particular OS or OSs may vary in accordance with a particular device, features or other aspects in accordance with a particular application (e.g. Windows, WindowsCE, Mac, Linux, Unix or Palm OS variants, a cell phone OS, a proprietary OS, Symbian, and so on). Various programming languages or other tools can also be utilized, such as those compatible with C variants (e.g., C++, C#), the Java 2 Platform, Enterprise Edition ("J2EE") or other programming. languages in accordance with the requirements of a particular application. Other programs 412 may further, for example, include one or more of activity systems, education managers, education integrators, or interface, security, other synchronization, other browser or groupware code, and so on, including but not limited to those discussed elsewhere herein.

When implemented in software (e.g. as an application program, object, agent, downloadable, servlet, and so on in whole or part), a learning integration system or other component may be communicated transitionally or more persistently from local or remote storage to memory (SRAM, cache memory, etc.) for execution, or another suitable mechanism can be utilized, and components may be implemented in compiled or interpretive form. Input, intermediate or resulting data or functional elements may further reside more transitionally or more persistently in a storage media, cache or other volatile or non-volatile memory, (e.g., storage device 408 or memory 409) in accordance with a particular application.

Other features, aspects and objects of the invention can be obtained from a review of the figures and the claims. It is to be understood that other embodiments of the invention can be developed and fall within the spirit and scope of the invention and claims. The foregoing description of preferred embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. A computer-readable storage medium storing one or more sequences of instructions for preparing a query plan for tuning a service, which instructions, when executed by one or more processors, cause the one or more processors to carry out the steps of:

receiving a query from a portal application to be executed against a system, said query associated with a service model, wherein the service model provides a plurality of structured views of available services to the portal application;

determining at least one of a plurality of ways capable of satisfying the query, wherein at least one of the plurality of ways includes accessing at least two tables in a database;

selecting, from the plurality of ways to satisfy the query, a preferred way for satisfying the query and meeting a performance criteria wherein selecting includes determining whether speed of query execution is more important than memory usage by employing parameters that correlate the relative importance of speed, memory and resource usage on the system that the query is executed against wherein selecting the preferred way for satisfying the query includes:

if speed is determined to be more important than memory usage: retrieving both of said at least two tables from the database and writing said at least two tables into memory;

if speed is determined not to be more important than memory usage: determining whether memory capacity is constrained by only one of said at least two tables and if the memory capacity is constrained by only one of said at least two tables, then retrieving a smaller table of said two tables from the database and writing said smaller table into the memory;

otherwise, if speed is determined not to be more important than memory usage and if both tables are too large to be brought into the memory: requesting values from each of said at least two tables as needed from the database;

generating the query plan and providing the preferred way as at least a portion of the query plan; and accessing a service according to the query plan to receive a result set, wherein the result set is mapped to one of the plurality of structured views that is specifically suited to the format of the portal application that has submitted the query.

2. The computer-readable storage medium as recited in claim 1, further comprising instructions for carrying out the steps of:

providing the result set and information about time or resources usage to perform the query to the portal application; and receiving from the portal application input specifying a change to the query plan for improving query efficiency.

3. The computer-readable storage medium as recited in claim 1, wherein the performance criteria is a condition placed upon a time or resources usage.

4. The computer-readable storage medium as recited in claim 2, wherein instructions for providing the result set and information about time or resources usage to perform the query to the portal application further comprises instructions for carrying out the steps of:

displaying the query plan to an operator; and receiving from the operator an input indicating at least one of: an acceptance of the query plan and a modification to the query plan;

thereby enabling the operator to examine the query plan and response time for query execution.

5. The computer-readable storage medium as recited in claim 1, wherein instructions for selecting, from the plurality of ways to satisfy the query, a preferred way for satisfying the query and meeting a performance criteria, comprise instructions for carrying out the steps of:

reading each of a plurality of tables into memory and then performing a join operation, if speed performance is preferred over memory usage performance.

6. The computer-readable storage medium as recited in claim 1, wherein instructions for selecting, from the plurality of ways to satisfy the query, a preferred way for satisfying the query and meeting a performance criteria, comprise instructions for carrying out the steps of:

reading a smaller one of the plurality of tables into memory and then requesting values from remaining tables in a plurality of tables, as needed to complete a join operation, if memory capacity would be constrained by at least one table.

7. The computer-readable storage medium as recited in claim 1, wherein instructions for selecting, from the plurality of ways to satisfy the query, a preferred way for satisfying the query and meeting a performance criteria, comprise instructions for carrying out the steps of:

requesting values from each of a plurality of tables as needed to complete a join operation, if memory capacity would be constrained by at least two tables.

8. The computer-readable storage medium as recited in claim 1, wherein instructions for selecting, from the plurality of ways to satisfy the query, a preferred way for satisfying the query and meeting a performance criteria, comprise instructions for carrying out the steps of:

selecting a preferred technique for preparing a query plan for satisfying the query from at least one of: structured query language pushdown techniques, batched join processing techniques, index join techniques and parallel data source requests.

9. The computer-readable storage medium as recited in claim 1, wherein instructions for selecting, from the plurality of ways to satisfy the query, a preferred way for satisfying the query and meeting a performance criteria, comprise instructions for carrying out the steps of:

selecting a preferred way for satisfying the query and complying with at least one of: a maximum query response time, an average response time for data queries, a peak usage and a maximum degradation of performance.

10. The computer-readable storage medium as recited in claim 1, wherein instructions for selecting, from the plurality of ways to satisfy the query, a preferred way for satisfying the query and meeting a performance criteria, comprise instructions for carrying out the steps of:

selecting a preferred way for satisfying the query and meeting at least one of:

a type of join, a size of tables on which a join operation is requested and an historical performance of the service.

11. A method for tuning one or more services, comprising:

receiving a query from a portal application to be executed against a system, said query associated with a service model, wherein the service model provides a plurality of structured views of available services to the portal application;

determining at least one of a plurality of ways capable of satisfying the query, wherein at least one of the plurality of ways includes accessing at least two tables in a database;

selecting, from the plurality of ways to satisfy the query, a preferred way for satisfying the query and meeting a performance criteria wherein selecting includes determining whether speed of query execution is more important than memory usage by employing parameters that correlate the relative importance of speed, memory and resource usage on the system that the query is executed against wherein selecting the preferred way for satisfying the query includes:
  if speed is determined to be more important than memory usage: retrieving both of said at least two tables from the database and writing said at least two tables into memory;
  if speed is determined not to be more important than memory usage: determining whether memory capacity is constrained by only one of said at least two tables and if the memory capacity is constrained by only one of said at least two tables, then retrieving a smaller table of said two tables from the database and writing said smaller table into the memory;
  otherwise, if speed is determined not to be more important than memory usage and if both tables are too large to be brought into the memory: requesting values from each of said at least two tables as needed from the database;
generating the query plan and providing the preferred way as at least a portion of the query plan; and
accessing a service according to the query plan to receive a result set, wherein the result set is mapped to one of the plurality of structured views that is specifically suited to the format of the portal application that has submitted the query.

12. An apparatus for tuning one or more services, the apparatus comprising:
  a processor; and
  one or more stored sequences of instructions which, when executed by the processor, cause the processor to carry out the steps of:
  receiving a query from a portal application to be executed against a system, said query associated with a service model, wherein the service model provides a plurality of structured views of available services to the portal application;
  determining at least one of a plurality of ways capable of satisfying the query, wherein at least one of the plurality of ways includes accessing at least two tables in a database;
  selecting, from the plurality of ways to satisfy the query, a preferred way for satisfying the query and meeting a performance criteria wherein selecting includes determining whether speed of query execution is more important than memory usage by employing parameters that correlate the relative importance of speed, memory and resource usage on the system that the query is executed against wherein selecting the preferred way for satisfying the query includes:
    if speed is determined to be more important than memory usage: retrieving both of said at least two tables from the database and writing said at least two tables into memory;
    if speed is determined not to be more important than memory usage: determining whether memory capacity is constrained by only one of said at least two tables and if the memory capacity is constrained by only one of said at least two tables, then retrieving a smaller table of said two tables from the database and writing said smaller table into the memory;
    otherwise, if speed is determined not to be more important than memory usage and if both tables are too large to be brought into the memory: requesting values from each of said at least two tables as needed from the database;
  generating the query plan and providing the preferred way as at least a portion of the query plan; and
  accessing a service according to the query plan to receive a result set, wherein the result set is mapped to one of the plurality of structured views that is specifically suited to the format of the portal application that has submitted the query.

13. The computer readable storage medium of claim 1, wherein determining whether the speed of query execution is more important than memory usage further includes:
  inspecting the parameters correlating the relative importance of speed, memory and resource usage encoded in a data structure.

14. The computer readable storage medium of claim 1, wherein determining whether the speed of query execution is more important than memory usage further includes:
  automatically executing a set of test cases on the system in order to determine physical limitations that include one or more of the following: installed memory, processor clock speed, input/output (I/O) devices and configurations of the system.

* * * * *

UNITED STATES PATENT AND TRADEMARK OFFICE
CERTIFICATE OF CORRECTION

| | | |
|---|---|---|
| PATENT NO. | : 7,778,998 B2 | Page 1 of 1 |
| APPLICATION NO. | : 11/342111 | |
| DATED | : August 17, 2010 | |
| INVENTOR(S) | : Naveen Gupta | |

It is certified that error appears in the above-identified patent and that said Letters Patent is hereby corrected as shown below:

In column 2, line 41, delete "requester." and insert -- requestor. --, therefor.

In column 2, line 61, delete "requester," and insert -- requestor, --, therefor.

In column 4, line 50, delete "requester" and insert -- requestor --, therefor.

Signed and Sealed this
Tenth Day of May, 2011

David J. Kappos
*Director of the United States Patent and Trademark Office*